United States Patent Office 3,657,394
Patented Apr. 18, 1972

3,657,394
BLENDS OF POLYVINYL CHLORIDE RESINS AND ETHYLENE-SO₂ TERPOLYMERS AND FILMS FORMED THEREFROM
Clarence Frederick Hammer and James Joseph Hickman, Wilmington, Del., assignors to E. I. du Pont de Nemours and Company, Wilmington, Del.
No Drawing. Filed Apr. 28, 1970, Ser. No. 32,728
Int. Cl. C08f 29/24
U.S. Cl. 260—897 C
10 Claims

ABSTRACT OF THE DISCLOSURE

Highly compatible, clear blends of PVC resins with ethylene-SO₂ terpolymers can be formed containing 5 to 40 percent of the latter. High modulus films can be extruded therefrom at a reasonable rate.

BACKGROUND OF THE INVENTION

This invention relates to blends of polymeric materials and, more particularly, to blends of polyvinyl chloride resins with sulfur dioxide polymers and films formed therefrom.

Films of unplasticized polyvinyl chloride resins are valuable because of their rigidity in combination with chemical and flame resistance. Such films, however, are very difficult to melt extrude at a commercially acceptable rate. If temperatures are increased in an effort to increase the extrusion rate, substantial degradation may take place; at lower temperatures, the rate is unacceptably slow. Also, if the rate is slow, degradation will occur because of the long hold-up time.

It is known to add many materials, including certain sulfur dioxide polymers, to polyvinyl chloride to improve its moldability and the like. Such materials, however, tend to plasticize the polyvinyl chloride with a resultant loss in rigidity.

SUMMARY OF THE INVENTION

It has unexpectedly been found that rigid, i.e., high-modulus, films can be formed from a blend consisting essentially of (a) a terpolymer of ethylene, sulfur dioxide and another ethylenically unsaturated polar monomer copolymerizable therewith, said terpolymer containing from about 10 to 60 weight percent ethylene units with the molar ratio of polar monomer units to sulfur dioxide units ranging from about 1.3:1 to 2.7:1, and (b) a polyvinyl chloride resin; said terpolymer being about 5 to 40 weight percent of the blend.

DETAILED DESCRIPTION OF THE INVENTION

The weight percent of terpolymer in the blend ranges from about 5 to about 40%. Above the upper limits, e.g., at about 50% terpolymer, there is a loss of rigidity. Below the lower limit, there is a loss of melt extrudability at lower temperatures. Within the range, the tensile strength shows a gradual peak about in the middle. The ethylene content of the terpolymer can range between about 10 to 60 weight percent; however, the preferred range is between about 25 to 55 weight percent. When the mole ratio of polar monomer to sulfur dioxide is between about 1.3:1 to 2.7:1 (preferably between 1.7:1 to 2.3:1), optimum rigidity across a wide range of percentages of terpolymer and polyvinyl chloride is obtained. When that ratio is either increased to 3:1 or lowered to 1:1, the rigidity (as measured by modulus) steadily decreases with increasing amounts of terpolymer and the behavior corresponds to ordinary plasticization phenomenon.

In the terpolymer, one must employ certain minimum amounts of polar monomer and sulfur dioxide for clarity. The following equation expresses the relationship to obtain satisfactory clarity: The weight percent polar monomer units, plus five times the weight percent sulfur dioxide units, must ordinarily be at least 57 to obtain maximum clarity.

The preferred polar monomer is vinyl acetate. Representative of other polar monomers are methyl methacrylate, acrylonitrile, acrylic acid, methacrylic acid and vinyl ethers.

The terpolymers used in this invention can be prepared as described in assignee's application of C. F. Hammer, entitled "Ethylene Interpolymers, Processes for Their Preparation and Compositions Formed Therewith," Ser. No. 32,740, filed concurrently herewith. The teachings of that application are incorporated herein by reference.

The polymers of the Hammer reference have an unusual great propensity for forming compatible blends with a wide variety of polymers. The degree of compatibility varies. A convenient measure of compatibility is the amount of shifting of the low temperature peaks (usually attributable to the onset of inter- and intramolecular motions) and the glass transition temperature in the torsion pendulum loss spectrum of the blend. An explanation of this spectrum, which is a plot of internal friction vs. temperature, and the experimental technique for its determination can be found in, Anelastic and Dielectric Effects in Polymeric Solids by N. G. McCrum, B. E. Read and G. Williams, John Wiley & Sons, London, 1967. The spectra of incompatible blends show no shifting of the low temperature peaks and no shifting of the glass transition temperature from their positions in the spectra of the individual polymer components. That is, the spectrum of the incompatible blend is essentially an addition of the spectra of the polymer components. Films, made from such blends are usually hazy. Blends that have a reasonable degree of compatibility and that can be formed into clear films also show a lack of shifting of the low temperature peaks but only display a single glass transition temperature.

In contrast, the terpolymers of this invention appear to interact strongly with other polymers, for example PVC, and form extremely compatible blends that can be formed into clear films. In the torsion pendulum loss spectra of these blends, the low temperature peak for each polymer is shifted and only a single, sharp glass transition temperature appears.

If desired, the blends of this invention can also be modified by the addition of very small amounts of stabilizers, slip agents, and other adjuvants conventional for polyvinyl chloride resins.

Films made from the blends of this invention have been found to exhibit good dead-fold properties, i.e., articles can be formed by mere folding without the application of heat, etc. The films also display good grease resistance, low water and oxygen permeability and improved heat sealability. The glass transition temperature (Tg) of the blend is also lower, e.g., as low as about 10° C., as compared with rigid PVC, e.g., about 90° C. The tensile strength is also somewhat improved over rigid PVC resin films. Additionally, the presence of the terpolymer is non-migratory, i.e., it will not leach out in ordinary usage.

The ingredients of the blends of this invention can be mixed in a variety of ways. A preferred method is to cool the terpolymer to well below its glass transition temperature, grind to a powder, and mix with powdered PVC. This powdered mixture is then fed to a Werner-Pfleiderer extruder. The powders can also be mixed on a Banbury mixer, a calender, or a rubber mill, or be dissolved in solvents, the solutions mixed, and the solvents evaporated.

The invention will now be described in connection with the following examples thereof wherein parts and percentages are by weight unless otherwise specified.

EXAMPLES 1-4

A terpolymer containing 46% ethylene, 40% vinyl acetate and 14% sulfur dioxide is prepared in accordance with the teachings of the Hammer application referred to above. The mole rtaio of vinyl acetate to sulfur dioxide units is about 2.1:1. The inherent viscosity (0.5% solution in acetone at 30° C.) is about 0.33 indicating a weight average molecular weight of about 47,000.

A polyvinyl chloride (PVC) resin "Geon 103EP," commercially available from B. F. Goodrich Chemical Co., Cleveland, Ohio) having an inherent viscosity (0.5% solution in tetrahydrofuran at 30° C.) of about 0.98 is selected. The resin contains about 2 phr. (parts per hundred parts of resin) of a tin stabilizer,

$(C_8H_{17})_2Sn(SCH_2COOC_8H_{17})_2$ ("Thermolite 31" commercially available from M. & T. Chemicals Inc., Rahway, N.J.).

Four different blends are prepared by mixing 10, 20, 30 and 40 parts of terpolymer with 90, 80, 70 and 60 parts of PVC respectively. Ten parts of each blend are dissolved in 12 parts of tetrahydrofuran (THF). The solvent is evaporated and each blend is mixed on a rubber mill at 170° C. for 15 minutes. Each blend is then melt pressed into a film, 6 mils thick, by preheating at 190° C. and 5000 p.s.i. for 3 minutes and then applying 20 tons at 190° C. with a subsequent water quench. The table below indicates representative results determined at 23° C. and 50% relative humidity:

TABLE I

| | Ex. 1 | Ex. 2 | Ex. 3 | Ex. 4 |
|---|---|---|---|---|
| Terpolymer (percent) | 10 | 20 | 30 | 40 |
| Tensile strength (p.s.i.) | 5,000 | 5,500 | 5,500 | 3,600 |
| Elongation at break (percent) | 18 | 2.5 | 2.4 | 26.5 |
| Modulus (1,000 p.s.i.) | 283 | 284 | 268 | 199 |
| Tg (° C.) | 54 | 36 | 30 | 18 |
| Melt index of blends * | 0.05 | 0.11 | 0.75 | >0.75 |

* In gm./10 min. at 190° C., 10 min. preheat and a wt. of 8,511.

EXAMPLE 5

A terpolymer containing 52.6% ethylene, 34.8% vinyl acetate, and 12.6% sulfur dioxide is prepared in accordance with the teachings of the Hammer application referred to above. The mole ratio of vinyl acetate to sulfur dioxide units is about 2.0:1. The terpolymer has an inherent viscosity (0.5% in solution in acetone at 30° C.) of about 0.31 indicating a weight-average molecular weight of about 41,000.

A PVC resin ("Exon 9290" commercially available from Firestone Tire and Rubber Co., Akron, Ohio) having an inherent viscosity (0.5% THF solution at 30° C.) of 0.765 is selected. The resin contains about 2 phr. of tin stabilizer ("Thermolite 831") chemically the same as that in Example 1.

The PVC and the terpolymer are blended on a rubber mill for 15 minutes at 170° C. Eight parts of the PVC are added first with 2 parts of terpolymer blended in. A film formed as described in Example 1 exhibits the following properties at ambient conditions:

Tensile strength, 6300 p.s.i.
Elongation, 2.6%
Modulus, 275,000 p.s.i.
Tg, 43° C.

EXAMPLE 6

A terpolymer containing 55.9% ethylene, 29.5% vinyl acetate and 14.6% sulfur dioxide is prepared in accordance with the teachings of the aforementioned Hammer application. The inherent viscosity (0.5% acetone solution at 30° C.) is between about 0.40 and 0.45.

The PVC resin ("Opalon 630" commercially available from Monsanto Chemical Co., St. Louis, Mo.) has an inherent viscosity of 0.72 (0.5% THF solution at 30° C.). About 2 phr. of the stabilizer of Example 5 is employed. About 30 parts of terpolymer are blended into 70 parts of PVC on a rubber mill at 170° C. for 20 minutes. The films are formed as in Example 1 and found to exhibit the following properties at ambient conditions:

Tensile strength, 5500 p.s.i.   Modulus, 258,000 p.s.i.
Elongation, 3%   Melt index, 18 gm./10 min.

To prepare terpolymers using other polar monomers, one follows the teachings of the aforementioned Hammer application. Such terpolymers can be blended and formed into films in accordance with the teachings therein.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:

1. A blend consisting essentially of (a) a terpolymer of ethylene, sulfur dioxide and another ethylenically unsaturated polar monomer copolymerizable therewith, said terpolymer containing from about 10 to 60 weight percent ethylene units with the molar ratio of polar monomer units to sulfur dioxide units ranging from about 1.3:1 to 2.7:1, and (b) a polyvinyl chloride resin; said terpolymer being about 5 to 40 weight percent of the blend.

2. The blend of claim 1 wherein the ethylene unit content of said terpolymer ranges from about 25 to 55 weight percent.

3. The blend of claim 2 wherein the molar ratio of polar monomer units to sulfur dioxide units ranges from about 1.7:1 to 2.3:1.

4. The blend of claim 3 wherein the polar monomer is vinyl acetate.

5. The blend of claim 4 wherein the sum of the weight percent vinyl acetate units, plus five times the weight percent sulfur dioxide units, is at least 57.

6. A polymer film formed from a blend consisting essentially of (a) a terpolymer of ethylene sulfur dioxide and another ethylenically unsaturated polar monomer copolymerizable therewith, said terpolymer containing from about 10 to 60 weight percent ethylene units with the molar ratio of polar monomer units to sulfur dioxide units from about 1.3:1 to 2.7:1, and (b) a polyvinyl chloride resin; said terpolymer being about 5 to 40 weight percent of the blend.

7. The film of claim 6 wherein the ethylene unit content of said terpolymer ranges from about 25 to 55 weight percent.

8. The film of claim 7 wherein the molar ratio of polar monomer units to sulfur dioxide units ranges from about 1.7:1 to 2.3:1.

9. The film of claim 8 wherein the polar monomer is vinyl acetate.

10. The film of claim 9 wherein the sum of the weight percent vinyl acetate units, plus five times the weight percent sulfur dioxide units, is at least 57.

References Cited

UNITED STATES PATENTS

| 2,719,139 | 9/1955 | Wicklatz | 260—45.5 |
| 2,241,900 | 5/1941 | Brubaker et al. | 260—80 |
| 2,645,631 | 7/1953 | Crouch et al. | 260—79.3 |

MURRAY TILLMAN, Primary Examiner

C. SECCURO, Assistant Examiner

U.S. Cl. X.R.

260—45.75 K, 79.3 A

PO-1050
(5/69)

UNITED STATES PATENT OFFICE
CERTIFICATE OF CORRECTION

Patent No. 3,657,394        Dated April 18, 1972

Inventor(s) Clarence Frederick Hammer and James Joseph Hickman

It is certified that error appears in the above-identified patent and that said Letters Patent are hereby corrected as shown below:

Column 3, line 43, "8,511." should read -- 8,511 gm. --.

Column 4, line 11, "18 gm." should read -- 1.8 gm. --.

Column 4, line 44, a comma (,) should appear after "ethylene".

Signed and sealed this 26th day of December 1972.

(SEAL)
Attest:

EDWARD M. FLETCHER, JR.　　　　　　　　　ROBERT GOTTSCHALK
Attesting Officer　　　　　　　　　　　　Commissioner of Patents